United States Patent
Rupar et al.

(10) Patent No.: US 10,011,683 B2
(45) Date of Patent: Jul. 3, 2018

(54) SYNTHESIS OF LINEAR POLYETHYLENEIMINE BY LIVING ANIONIC POLYMERIZATION

(71) Applicant: THE BOARD OF TRUSTEES OF THE UNIVERSITY OF ALABAMA, Tuscaloosa, AL (US)

(72) Inventors: Paul A. Rupar, Tuscaloosa, AL (US); Louis Reisman, Tuscaloosa, AL (US); Pierre Canisius Mbarushimana, Tuscaloosa, AL (US)

(73) Assignee: THE BOARD OF TRUSTEES OF THE UNIVERSITY OF ALABAMA, Tuscaloosa, AL (US)

(*) Notice: Subject to any disclaimer, the term of this patent is extended or adjusted under 35 U.S.C. 154(b) by 0 days.

(21) Appl. No.: 15/405,915

(22) Filed: Jan. 13, 2017

(65) Prior Publication Data

US 2017/0204224 A1 Jul. 20, 2017

Related U.S. Application Data

(60) Provisional application No. 62/278,836, filed on Jan. 14, 2016.

(51) Int. Cl.
C08G 73/02 (2006.01)

(52) U.S. Cl.
CPC ..... *C08G 73/0213* (2013.01); *C08G 73/0206* (2013.01)

(58) Field of Classification Search
CPC ................................. C08G 73/0213
USPC ................................. 525/417, 435
See application file for complete search history.

(56) References Cited

U.S. PATENT DOCUMENTS 5,631,329 A * 5/1997 Yin .................. A61K 47/48961
  525/279
2014/0148374 A1* 5/2014 Man ........................ C11D 1/94
  510/475

OTHER PUBLICATIONS

Jager, et al., "Branched and linear poly(ethylene imine)-based conjugates: synthetic modification, characterization, and application.", Chem. Soc. Rev. 2012, 41, 4755-4767.
Demember, "A reinvestigation of the chemical reactivity of N-perfluoroacylaziridines", J. Polym. Sci., Part A: Polym. Chem. 1979, 17, 1089-1101.
Pittman, A. G.; Lundin, R. E., "Synthesis and polymerization of 1-(perfluoroacyl)aziridines", J. Polym. Sci., Part A: Polym. Chem. 1964, 2, 3803-3810.
Lambermont-Thijs, H. M. L.; Bonami, L.; Du Prez, F. E.; Hoogenboom, R.,"Linear poly(alkyl ethylene imine) with varying side chain length: synthesis and physical properties", Polym. Chem. 2010, 1, 747-754.
Wiesbrock, et al., "Investigation of the Living Cationic Ring-Opening Polymerization of 2-Methyl-, 2-Ethyl-, 2-Nonyl-, and 2-Phenyl-2-oxazoline in a Single-Mode Microwave Reactor", Macromolecules 2005, 38, 5025-5034.
Tauhardt, L.; Kempe, K.; Schubert, U. S., J. Polym. Sci., Part A: Polym. Chem. 2012, 50, 4516-4523.
Stewart, et al., "Living Ring-Opening Polymerization of N-Sulfonylaziridines: Synthesis of High Molecular Weight Linear Polyamines", J. Am. Chem. Soc. 2005, 127, 17616-17617.

* cited by examiner

*Primary Examiner* — Terressa Boykin
(74) *Attorney, Agent, or Firm* — Meunier Carlin & Curfman LLC

(57) ABSTRACT

Disclosed herein are methods for the productions of linear polyethyleneimine using living anionic polymerization of appropriately functionalized aziridine monomers.

13 Claims, No Drawings

SYNTHESIS OF LINEAR POLYETHYLENEIMINE BY LIVING ANIONIC POLYMERIZATION

CROSS REFERENCE TO RELATED APPLICATION

This application claims the benefit of U.S. Provisional Application 62/278,836, filed Jan. 14, 2016, the entire contents of which are hereby incorporated by reference.

FIELD

The invention is generally directed to the synthesis of linear polyethyleneimine via polymerization of functionalized aziridine monomers.

BACKGROUND

Polyethyleneimine (PEI) is an important polymer that is useful in a wide range of commercial, biomedical, and research applications. PEI has been used as an excipient for pharmaceutical formulations, as a gene transfection agent, as an interface modifier for organic electronics, as a component in ion exchange resins, as a dye uptake modifier in the textile industry, as a gas absorber, and as a metal ion chelation agent for waste water treatment. It has also been used during the deposition of metals onto surfaces.

Certain forms of PEI can be formed by the cationic ring-opening polymerization (CROP) of aziridine. However, this is a non-selective process, giving a heterogeneous mixture of highly branched polymers:

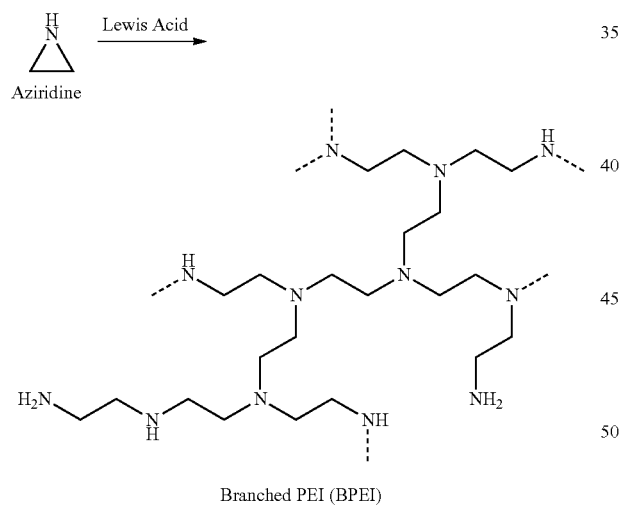

Branched PEI (BPEI)

The high degree of branching is the consequence of secondary amines along an existing polymer chain undergoing ring-opening reaction with unreacted aziridine monomers. The CROP of aziridine to form branched PEI is difficult to control and reproducibility between reaction batches is problematic. Due to the uncontrolled nature of the cationic polymerization heterogeneously branched polyethyleneimine have not been widely adopted in fields requiring batch uniformity, e.g., biomedical sciences and advanced manufacturing.

Linear PEI is known, and does not suffer from the heterogeneity problems associated with branched PEI. However, it has been more difficult to obtain linear PEI. It is not possible to synthesize linear unsubstituted PEI by a controlled polymerization directly from unsubstituted aziridine. Although installation of an electron withdrawing group (such as methanesulfonyl) at the nitrogen atom of an unsubstituted aziridine permits reaction via an anionic pathway to take place, it is not easy to obtain high molecular weight polymers by this method. The initially formed ethyleneimine oligomers are substantially insoluble in most solvents, and as they are formed they crystallize/precipitate from solution, effectively terminating the polymerization process.

2-alkyl-N-(methylsulfonyl)aziridine has been polymerized under living anionic conditions. Post-polymerization, the sulfonyl groups can be removed using lithium naphthalide to yield the linear PEI.

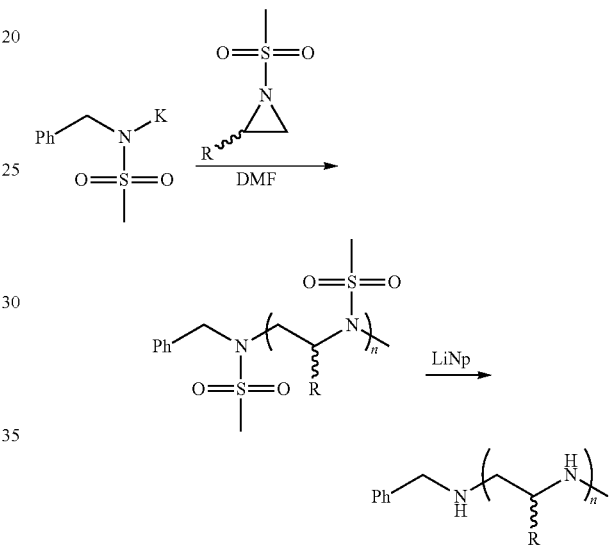

There are significant limitations to this technology. In particular, the polymerization proceeds to high molecular weight only if the N-sulfonylaziridine monomer is 2-substituted with an alkyl group and only if the monomer is racemic. If an enantiopure aziridine monomer is used, the growing polymer chain precipitates at low molecular weight. Furthermore, because the aziridine monomer must be substituted with an alkyl group for the polymerization to proceed, the final polymer has a lower nitrogen-to-carbon ratio than a polymer made from unsubstituted aziridine monomers.

As an alternative to polymerization of aziridine monomers, the polymerization of 2-oxazolines to form polyoxazolines (PDXs) has been explored. The resulting amide can be hydrolyzed to produce linear PEI.

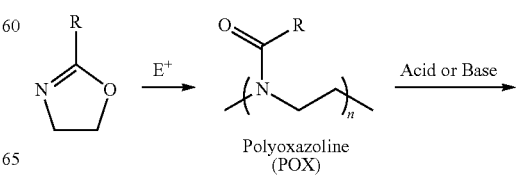

Polyoxazoline (POX)

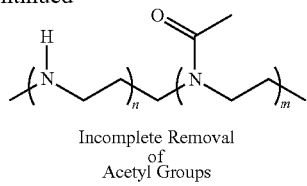

Incomplete Removal
of
Acetyl Groups

Although this method can be used to obtain high molecular weight polymers, they typically have broader molecular weight distributions due to chain-transfer and chain-coupling reactions. Furthermore, the necessary post-polymerization hydrolysis does not easily go to completion, even under harsh reaction conditions. As such, the resulting polyethyleneimine product can be contaminated with amide bearing polymers.

What are needed are controllable and robust methods for producing linear polyethyleneimine, especially unsubstituted polyethyleneimine. Also needed are linear polyethyleneimines with narrow molecular weight distributions, and linear polyethyleneimines that are not contaminated with partially amidated polyethyleneimine. The methods and compositions disclosed herein addresses these and other needs.

SUMMARY

In accordance with the purposes of the disclosed subject matter, as embodied and broadly described herein, this disclosure, in one aspect, relates to compositions and methods of making and using said compositions. In more specific aspects, disclosed herein are linear polyethyleneimines of high punt and/or low polydispersion, and methods of making the same. The linear polyethyeleneimine can be obtained by living anionic polymerization of an aziridine ring functionalized with one or more solubility enhancing groups.

Additional advantages of the disclosed compositions and methods will be set forth in part in the description which follows, and in part will be obvious from the description. The advantages of the disclosed compositions will be realized and attained by means of the elements and combinations particularly pointed out in the appended claims. It is to be understood that both the foregoing general description and the following detailed description are exemplary and explanatory only and are not restrictive of the disclosed compositions, as claimed.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, or thiol, as described below.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, or thiol as described herein.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. Unless specifically stated, a substituent that is said to be "substituted" is meant that the substituent is substituted with one or more of the following: alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, or thiol. In a specific example, groups that are said to be substituted are substituted with a protic group, which is a group that can be protonated or deprotonated, depending on the pH.

As used herein, substantially pure means sufficiently homogeneous to appear free of readily detectable impurities as determined by standard methods of analysis, such as thin layer chromatography (TLC), nuclear magnetic resonance (NMR), gel electrophoresis, high performance liquid chromatography (HPLC) and mass spectrometry (MS), gas-chromatography mass spectrometry (GC-MS), and similar, used by those of skill in the art to assess such purity, or sufficiently pure such that further purification would not detectably alter the physical and chemical properties, such as enzymatic and biological activities, of the subs Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Linear polyethyleneimine can be obtained by reaction of compounds of Formula (I) and (II):

wherein $R^1$ and $R^2$ are either both 2-nitrophenyl, or $R^1$ and $R^2$ are different and are each selected from substituted or unsubstituted $C_1$-$C_{12}$ alkyl, substituted or unsubstituted $C_3$-$C_8$ cycloalkyl, or substituted or unsubstituted phenyl.

In some embodiments, $R^1$ is a $C_1$-$C_2$ alkyl group and $R^2$ is $C_3$-$C_8$ alkyl, preferably $C_4$-$C_5$ alkyl. In some embodiments, $R^1$ is a branched $C_3$-$C_{12}$ alkyl group, preferably a branched $C_3$-$C_6$ alkyl group, and even more preferably a branched $C_4$-$C_5$ alkyl group. Exemplary branched alkyl groups include isopropyl, sec-butyl, iso-butyl, tert-butyl, sec-pentyl, neopentyl and the like.

In certain selected embodiment, $R^1$ is methyl, and $R^2$ is $C_4$ alkyl. In some embodiments, $R^2$ can be a $C_4$ alkyl selected from sec-butyl.

For embodiments in which $R^1$ and $R^2$ are different and are each selected from $C_1$-$C_{12}$ alkyl, the compounds of Formula (I) and (II) can be combined at a variety of molar ratios, for instance at a ratio of 5:1 to 1:5. In some embodiments, the ratio can be about 1:1. In other embodiments, the ratio can be from about 3:1 to about 1:3 $R^1$:$R^2$, from about 2:1 to about 1:2 $R^1$:$R^2$, from about 1.5:1 to about 1:1.5 $R^1$:$R^2$, or from about 1.25:1 to about 1:1.25 $R^1$:$R^2$.

The reaction can take place in the presence of an initiator, for instance an anionic initiator. Exemplary anionic initiators include nucleophilic salts of the formula:

or

wherein $R^3$ can be a $C_1$-$C_{12}$ alkyl group, $C_6$-$C_{12}$ aryl, —CN, —OR$^4$, —NR$^4{}_2$, or PR$^4{}_2$. $R^4$, when present, can be in each case independently selected from hydrogen, $C_1$-$C_{12}$ alkyl, $C_6$-$C_{12}$ aryl, SO$_2$R$^1$, or SiR$_3$. In some embodiments, $R^3$ is NR$^4{}_2$, wherein $R^4$ is as defined above.

$M^1$ can Group I atom, including Li, Na, K, Rb, or Cs, and $M^2$ can be a Group II atom, such as Mg or Ca.

In some embodiments, $R^3$ can be a $C_{1-6}$ alkyl, such as methyl, ethyl, isopropyl, butyl, s-butyl, t-butyl, pentyl or hexyl, while in other embodiments, $R^3$ can be a $C_6$-$C_{12}$ aryl, such as phenyl or tolyl.

The initiator can be added at various ratios relative to [mass/total mole] of the compounds of Formulas (I) and (II). Generally, molar ratios are preferred, relative to the total molar content of the compounds of Formulas (I) and (II). By way of example, the initiator can be present at a ratio of 1:10, 1:20, 1:30, 1:40, 1:50, 1:75, 1:100, 1:150, 1:200, 1:400 or less.

The reaction can take place in a solvent. Suitable solvents include polar, aprotic solvents, such as THF, DMF, DMSO, HMPA, MeCN, NMP and mixtures thereof. In certain embodiments, the initiator can be added to a solution of the compounds of Formulas (I) and (II), while is other embodiments, a solution of the compounds of Formulas (I) and (II) can be added, for instance, dropwise, to an initiator.

The reaction is quenched by addition of an anion capturing agent, for instance a proton donated from water, an alcohol or a weak acid. In some embodiments, the anionic polymerization can be quenched with an electrophile such as an acid halide, ester, or alkyl halide (including benzyl halides).

When quenched with a proton source, the initial product of the reaction is a protected polyethyleneimine compound of Formula (IV):

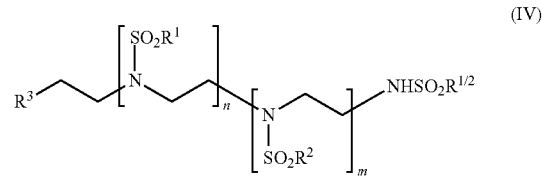

wherein n and m are both integers and sum of n+m is at least 100;

$R^1$ and $R^2$ containing monomers can be randomly distributed along the polymer chain, and the polyethyleneimine is terminated with either an $R^1$ or $R^2$ group;

R³ can be a C₁-C₁₂ alkyl group, C₆-C₁₂ aryl, —CN, —OR⁴, —NR⁴₂, or PR⁴₂; and

R⁴, when present, can be in each case independently selected from hydrogen, $C_1$-$C_{12}$ alkyl, $C_6$-$C_{12}$ aryl, $SO_2R^1$, or $SiR_3$.

The compound of Formula (IV) can be converted to linear polyethyleneimine of Formula (V).

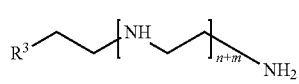

(V)

wherein n and m are both integers and sum of n+m is at least 100;

R³ can be a $C_1$-$C_{12}$ alkyl group, $C_6$-$C_{12}$ aryl, —CN, —OR⁴, –NR⁴₂, or PR⁴₂; and R⁴, when present, can be in each case independently selected from hydrogen, $C_1$-$C_{12}$ alkyl, $C_6$-$C_{12}$ aryl, $SO_2R^1$, or $SiR_3$.

When R¹ and R² are $C_1$-$C_{12}$ alkyl, they can be removed using lithium naphthalide, CsF with celite, alkali metals in HMPA, alkyl lithium compounds in polar solvents with subsequent exposure to oxygen. When R¹ and R² are both 2-nitrophenyl, they can be removed by treatment with a thiol, such as ethylthiol or thiophenol.

In some embodiments, the compound of Formula (V), can be characterized by a sum of n+m that is greater than 100, 200, 300, 400, 500, 600, 700, 800, 900, or 1,000. In some embodiments, the compound of Formula (V) can be characterized by a polydispersity index as measured by size exclusion chromatography of no greater than 1.2, 1.1, or 1.05. The compound of Formula (V) can have a Mw that is at least 1,000, 2,500, 5,000, 7,500, 10,000, 15,000, 20,000, 25,000 or 50,000.

In some embodiments, the compound of Formula (V) is characterized in that no amide groups are present in the polymer chains.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

To 5 mL of anhydrous DMF was added 11.0 mg (0.0550 mmol) of potassium bis(trimethylsilyl)amide followed by 10.0 mg (0.0540 mmol) of N-benzylmethanesulfonamide. This solution was allowed to stir for 1 hour at room temperature. To this solution was then added a 10 mL solution of anhydrous DMF containing 465 mg (3.84 mmol) of 1-(methylsulfonyl)aziridine and 628 mg (3.85 mmol) of 1-(sec-butylsulfonyl)aziridine. The polymerization was allowed to stir overnight. The solution was poured into water and the desired polymer precipitated as a white powder. The polymer was collected, dried and characterized by ¹H NMR spectroscopy and size exclusion chromatography. 450 mg, 41%, $M_n$ (NMR)=22,800 Da, $M_w$=23,400 Da, PDI=1.04. ¹H NMR (DMSO-d6): 0.95 (t), 1.23 (d), 1.45 (m), 1.86 (m), 2.99 (s), 4.34 (bs), 4.36 (bs), 7.35 (m).

170 mg of sodium tert-butoxide was added to 5 mL HMPA and the solution turned black. 80 mg of the random copolymer polymer was add. The reaction was stirred for 24 hours. The reaction was precipitated in an aqueous sodium hydroxide solution. Centrifugation yielded a white powder that was dried overnight under vacuum (35 mg, 100%).

Example 2

To 1 mL of anhydrous DMF was added lithium diisopropylamide (0.022 mmol) and N-benzylmethanesulfonylamide (0.022 mmol). This solution was then added to a 10 mL a solution of anhydrous DMF containing 1-(2-nitrophenyl) aziridine (100 mg, 0.44 mmol). After stirring the reaction mixture for approximately 20 minutes at room temperature, the solution was poured into 50 mL of methanol. The polymer precipitated as a white powder which was collected and characterized by ¹H NMR spectroscopy and size exclusion chromatography (96.6 mg, 96.6% yield). $M_n$=6,061 Da, PDI=1.10. ¹H NMR (DMSO-d6): δ 8.1-7.6 (br), 7.4-7.1 (m), 6.64 (t), 5.78 (d), 5.26 (d), 4.44 (s), 4.28 (s), 3.6-3.3 (br), 2.92 (s, 3H).

In a 250 mL round bottom flask, 1 g of poly(2-nitrobenzesulfonylaziridine) was dissolved into 150 mL DMF and to this solution $K_2CO_3$ (1.82 g) was added followed by thiophenol (0.538 mL). The mixture was then stirred at room temperature overnight. After 24 hours, additional thiophenol (0.538 mL, 5.26 mmol) was added, and the mixture was stirred overnight. The reaction mixture was precipitated in ether, and the resulting white solid was dissolved in hot water and cooled down to room temperature. Then a concentrated NaOH solution was added dropwise to precipitate the polymer. The deprotected polymer was collected by centrifugation at –4° C., and dried in the vacuum oven overnight (0.16 g, 85% yield).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A process for synthesizing a linear polyethyleneimine comprising:
combining a compound of Formula (I):

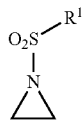
(I)

with a compound of Formula (II)

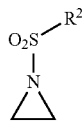
(II)

wherein
$R^1$ and $R^2$ are either both 2-nitrophenyl, or $R^1$ and $R^2$ are different and are each selected from $C_1$-$C_{12}$ alkyl, $C_3$-$C_8$ cycloalkyl, or substituted or unsubstituted phenyl;
and an anionic initiator selected from a compound of Formula (IIIa) or (IIIb):

$R^3$-$M^1$ (Formula IIIa)

or $(R^3)_2$-$M^2$ (Formula IIIb)

wherein
$M^1$ comprises Li, Na, K, Rb, or Cs;
$M^2$ comprises Mg or Ca;
$R^3$ is selected from the group consisting of $C_1$-$C_{12}$ alkyl group, $C_6$-$C_{12}$ aryl, —CN, —$OR^4$, —$NR^4_2$, $PR^4_2$; $R^4$, when present, is in each case independently selected from hydrogen, $C_1$-$C_{12}$ alkyl, $C_6$-$C_{12}$ aryl, $SO_2R^1$, and $SiR_3$
in a suitable solvent to give a linear polyethyleneimine of Formula (IV):

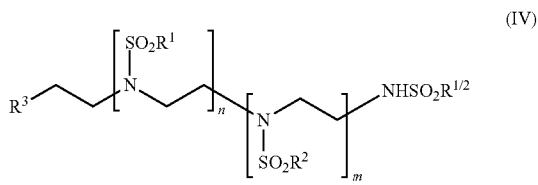
(IV)

wherein n+m is an integer greater than 100.

2. The process of claim 1, further comprising the step of removing the sulfonyl groups to give a linear polyethyleneimine of Formula (V)

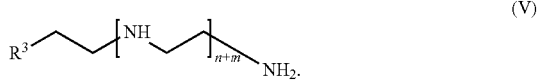
(V)

3. The process according to claim 1, wherein the anionic initiator comprises LDA, KHDMS, LiHDMS, NaHDMS, LiTMP, Na'OBu, K'OBu.

4. The process according to claim 1, wherein n+m is an integer greater than 200.

5. The process according to claim 1, wherein n+m is an integer greater than 400.

6. The process according to claim 1, wherein n+m is an integer greater than 600.

7. The process according to claim 1, wherein $R^1$ and $R^2$ are both 2-nitrophenyl.

8. The process according to claim 1, wherein $R^1$ and $R^2$ are different and are each selected from $C_1$-$C_{12}$ alkyl, $C_3$-$C_8$ cycloalkyl, or substituted or unsubstituted phenyl.

9. The process according to claim 8, wherein $R^1$ is methyl $R^2$ is $C_4$alkyl.

10. The process according to claim 9, wherein $R^2$ is sec-butyl.

11. A linear polyethyleneimine, characterized by a $M_n$>5,000; a polydispersity of no more than 1.10, further characterized in that the polyethyleneimine does not contain any amide functional groups.

12. The linear polyethyleneimine according to claim 11, having a $M_n$>10,000.

13. The linear polyethyleneimine according to claim 11, having a $M_n$>20,000.

* * * * *